United States Patent
Yoo et al.

(10) Patent No.: US 7,009,677 B2
(45) Date of Patent: Mar. 7, 2006

(54) LCD DEVICE IMPLEMENTING FLCP ORIENTATION FILM

(75) Inventors: Jang-Jin Yoo, Seoul (KR); Suk-Won Choi, Anyang-shi (KR); Su-Seok Choi, Hanam-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/050,838

(22) Filed: Feb. 7, 2005

(65) Prior Publication Data

US 2005/0134789 A1    Jun. 23, 2005

Related U.S. Application Data

(63) Continuation of application No. 09/747,932, filed on Dec. 27, 2000, now Pat. No. 6,876,425.

(30) Foreign Application Priority Data

Dec. 29, 1999  (KR) ................ 1999-65038

(51) Int. Cl.
*G02F 1/1337* (2006.01)
(52) U.S. Cl. .................. 349/172; 349/94; 349/183
(58) Field of Classification Search .............. 349/76, 349/88, 94, 99, 127, 172, 187
See application file for complete search history.

(56) References Cited

U.S. PATENT DOCUMENTS

| | | | |
|---|---|---|---|
| 4,995,705 | A | 2/1991 | Yoshinaga et al. |
| 5,372,745 | A | 12/1994 | Yoshinaga et al. |
| 5,444,651 | A | 8/1995 | Yamamoto et al. |
| 5,734,457 | A | 3/1998 | Mitsui et al. |
| 5,844,651 | A | 12/1998 | Reimer et al. |
| 5,973,762 | A | 10/1999 | Vorfloussev |

OTHER PUBLICATIONS

L. Komitov et al.; Fast Switching by Electrically Commanded Surfaces (ECS); Chalmers Univeristy of Technology, S-41296, , Sweden: FLC 99 Conference Summaries; 7th International Conference on Ferroelectric Liquid Crystals; Aug. 29-Sep. 3, 1999; Cover pg. and pp. 26-27.

*Primary Examiner*—Robert Kim
*Assistant Examiner*—Richard H Kim
(74) *Attorney, Agent, or Firm*—McKenna Long & Aldridge LLP

(57) ABSTRACT

A liquid crystal display device having first and second substrates with an interposed liquid crystal layer that has a negative or a positive dielectric anisotropy. First and second electrodes are formed on opposing surfaces of the first and second substrates. A first orientation film comprised of a ferroelectric liquid crystal polymer is formed on the first electrode, and a second orientation film is formed on the second electrode. First and second polarizers are formed on exterior surfaces of the first and second substrates.

10 Claims, 8 Drawing Sheets

LCD DEVICE IMPLEMENTING FLCP ORIENTATION FILM

This application is a continuation of prior application Ser. No. 09/747,932, filed Dec. 28, 2000 now U.S. Pat. No. 6,876,425, which claims the benefit of Korean Patent Application No. 1999-65038, filed Dec. 29, 1999, which are incorporated herein by reference in their entirety.

BACKGROUND OF THE INVENTION

1. Field of the Invention

The present invention relates to liquid crystal display devices. More particularly it relates to liquid crystal displays having a ferroelectric liquid crystal polymer orientation film.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a desired light image can be produced.

While various types of liquid crystal display devices are known, active matrix LCDs having thin film transistors and pixel electrodes arranged in a matrix are probably the most common. This is because such active matrix LCDs can produce high quality images at reasonable cost.

FIG. 1 is a cross-sectional view illustrating a conventional twisted nematic (TN) LCD cell in an active matrix LCD. As shown, the TN-LCD cell has upper and lower substrates 1a and 1b and an interposed TN-LC layer "LC". The lower substrate 1b has a TFT ("TFT") as a switching element that switches a voltage that changes the orientation of the LC molecules. The lower substrate 1b also includes a pixel electrode 115 that is used to apply an electric field across the LC layer in response to signals applied to the TFT. The upper substrate 1a has a color filter 25 for producing a color, and a common electrode 114 on the color filter 25. The common electrode 114 serves as an electrode that produces the electric field across the LC layer (with the assistance of the pixel electrode 115). The pixel electrode 115 is arranged over a pixel portion "P," i.e., a display area. Further, to prevent leakage of the LC layer, the two substrates 1a and 1b are sealed by a sealant 6.

As described above, since the pixel and common electrodes 115 and 114 of the conventional TN-LCD panel are positioned on the lower and upper substrates 1b and 1a, respectively, the electric field induced between them is perpendicular to the lower and upper substrates. The described liquid crystal display device has advantages of high transmittance and a high aperture ratio. Furthermore, as the common electrode on the upper substrate acts as a ground, the liquid crystal is shielded from static electricity.

When no electric field is applied to the LC, the TN-LC molecules are aligned as shown in FIG. 2. As shown by the arrows, the longitudinal axes of the TN-LC molecules gradually twist along polar angles (along a helical axis) with respect to the substrates such that the TN-LC molecules gradually rotate 90 degrees between the lower substrate 1b and the upper substrate 1a. Also as shown in FIG. 2, first and second polarizers 18 and 30 are positioned on the exterior surfaces of the lower and upper substrates 1b and 1a, respectively. The longitudinal axes of the liquid crystal molecules in contact with the lower substrate 1b align with the axis of the first polarizer 18. Likewise, the longitudinal axes of the liquid crystal molecules in contact with the upper substrate 1a align with the axis of the second polarizer 30.

Without an electric field applied across the LC, when light is incident on the first substrate 1b the portion of that incident light that is polarized in the direction of the first polarizer 18 enters the liquid crystal cell. The liquid crystal LC twists the polarization of the entering light until it reaches the second polarizer 30. Then, the light has the same polarization as the polarization of the second polarizer 30. The light then freely leaves the liquid crystal cell.

Referring now to FIG. 3, when an electric field "E" is applied across the liquid crystal LC, the TN-LC molecules align perpendicular to the upper and lower substrates 1a and 1b. That is to say, the molecular alignment of the TN-LC is set by the perpendicular electric field E such that the longitudinal axes of the TN-LC molecules tend to become parallel with the direction of the electric field E. The rotation of the polarization of the incident light that enters the first polarizer 18 does not take place. The entering light is then blocked by the second polarizer 30.

A TN-LCD that operates according to the foregoing description has a serious disadvantage in that it has a narrow viewing angle. Since the TN-LC molecules are gradually rotated with a gradual change of the polar angle, the contrast ratio and brightness rapidly fluctuate with respect to the viewing angle.

Accordingly, to address the above-mentioned problem, an in-plane switching (IPS) LCD panel has been developed. Unlike the TN (or STN) LCD panel described above, an IPS-LCD panel uses an electric field that is parallel with the substrates.

A more detailed explanation about the operation of a typical IPS-LCD panel will be provided with reference to FIGS. 4 through 8.

As shown in FIG. 4, lower and upper substrates 1a and 1b are spaced apart from each other, and a liquid crystal "LC" is interposed therebetween. The lower and upper substrates 1a and 1b are often referred to as array and color filter substrates, respectively. On the lower substrate 1a are a pixel electrode 15 and a common electrode 14. The pixel and common electrodes 15 and 14 are aligned parallel to each other. On a surface of the upper substrate 1b is a color filter 25 that is positioned between the pixel electrode and the common electrode of the lower substrate 1a. A voltage applied across the pixel and common electrodes 15 and 14 produces an electric field "E" through the liquid crystal "LC." The liquid crystal "LC" has a negative dielectric anisotropy, and thus it aligns parallel to the electric field "E".

FIGS. 5 to 8 conceptually help illustrate the operation of a conventional IPS-LCD device. When no electric field is produced by the pixel and common electrodes 15 and 14 (reference FIG. 5), the longitudinal axes of the LC molecules "LC" are parallel. For example, FIG. 6 shows a common angle of 45 degrees between a line that is perpendicular to the pixel and common electrodes 15 and 14 and the longitudinal axes of the LC molecules.

On the contrary, when an electric field is produced by the pixel and common electrodes 15 and 14 (reference FIG. 7), because the pixel and common electrodes 15 and 14 are on the lower substrate 1a, an in-plane electric field "E" that is parallel to the surface of the lower substrate 1a is produced. Accordingly, the LC molecules "LC" twist to bring their longitudinal axes into coincidence with the electric field. Thus, as shown in FIG. 8, the LC molecules align with their longitudinal axes parallel with a line perpendicular to the pixel and common electrodes 15 and 14.

In the above-mentioned IPS-LCD panel, there is no transparent electrode on the color filter. Furthermore, the liquid crystal used in the above-mentioned IPS-LCD panel has a negative dielectric anisotropy.

The IPS-LCD mode has an advantage of a wide viewing angle. Namely, when a user looks at the IPS-LCD display device a wide viewing angle of about 70 degrees in all directions (up, down, right and left) is achieved. Additionally, the IPS-LCD device has low color dispersion and a relatively simple fabrication process.

However, since the pixel and common electrodes are on the same substrate, the transmittance and aperture ratios are low. In addition, the response time to a driving voltage is not optimal. Finally, the color of their images tends to depend on the viewing angle.

FIG. 9 is a graph of the CIE (Commission Internationale de l'Eclairage) color coordinates of a conventional IPS-LCD device that shows the dispersion of color. The horseshoe-shaped area is the distribution range of the wavelength of visible light. The results are measured using a standard white light source [point (0.313, 0.329) in CIE coordinates] and various viewing angles of right, left, up and down, and 45 and 135 degrees. The range of the color dispersion is so long that the white light emitted from the conventional IPS-LCD device is dispersed largely according to the viewing angle. This results from the fact that the operation of the conventional IPS-LCD device is controlled by birefringence.

SUMMARY OF THE INVENTION

Accordingly, the present invention is directed to an LCD device that substantially obviates one or more of the problems due to limitations and disadvantages of the related art.

An object of the present invention is to provide an LCD device having a low color dependence on viewing angle and a high aperture ratio.

In order to achieve the above object, an embodiment in accordance with the principles of the present invention provides a liquid crystal display device that includes first and second substrates having first and second electrodes. A first orientation film is on the first electrode. That first orientation film includes a ferroelectric liquid crystal polymer. A second orientation film is on the second electrode. The second orientation film includes a homogeneous alignment film. A liquid crystal layer is disposed between the first and second substrates. The liquid crystal layer can have either a positive dielectric anisotropy or a negative dielectric anisotropy. The liquid crystal layer can also include a chiral dopant. Beneficially, the device further includes first and second polarizers on surfaces of the first and second substrates.

In the device, the polarizing axis of the first polarizer is perpendicular to an alignment direction of the first orientation film. The polarizing axis of the second polarizer is parallel with an alignment direction of the second orientation film.

In another aspect, the principles of the present invention provide a method of fabricating a liquid crystal display device. That method includes forming first and second electrodes on first and second substrates, and forming a first orientation film on the first electrode. That first orientation film includes a ferroelectric liquid crystal polymer. A second orientation film is formed on the second electrode. In the method, the second orientation film includes a homogeneous alignment film. A liquid crystal layer is disposed between the first and second substrates. The method further includes forming first and second polarizers on surfaces of the first and second substrates. The first polarizer is formed with a polarizing axis that is perpendicular to an alignment direction of the first orientation film. The second polarizer is formed with a polarizing axis that is parallel with an alignment direction of the second orientation film.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENT

Reference will now be made in detail to an illustrated embodiment of the present invention, an example of which is shown in the accompanying drawings.

In a conventional liquid crystal display device, orientation films are used to orientate a liquid crystal layer. Such films are typically formed by a rubbing process that is applied to a polyimide (PI) to form minute grooves in the PI. However, in the illustrated embodiment of the present invention, a ferroelectric liquid crystal polymer (FLCP) is used as an orientation film.

A FLC has characteristics of spontaneous polarization and bistability. They are capable of providing high quality images without contrast degradation or flickers. In addition, the FLC has a hundred times faster response than the TN LC or STN LC. This is due to the spontaneous polarization of the FLC. The high speed response of the FLC enables faster responses, such as to a mouse that is used as a data input apparatus in computers and/or to window operating systems that are widely used in computers.

Figure 10:
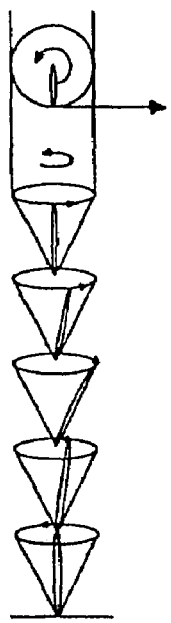
FIG. 10 shows an alignment structure of a FLC.

FIG. 10 shows a molecular alignment of the FLC. As shown, the longitudinal axes of FLC molecules gradually rotate to form a helical structure. Due to the helical structure, the FLC is appropriate for use in large-scale LCD devices needing wide viewing angles.

In the illustrated embodiment of the present invention, the alignment direction of the orientation film changes according to an applied electric field, thus using the electrical property of the FLC. Therefore, a liquid crystal display device having a superior optical property can be provided. That is, the FLCP controls the alignment of the liquid crystal layer according to an applied electric field.

Now, with reference to the drawings, a liquid crystal display device according to an illustrated embodiment will be explained in detail.

Figure 1:
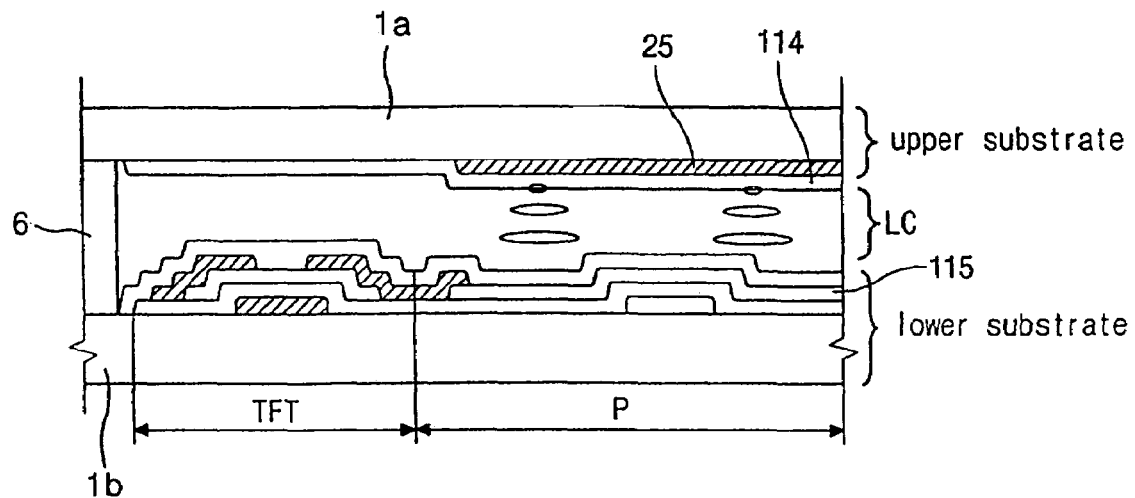
FIG. 1 is a cross-sectional view illustrating a liquid crystal display device according to the related art.
Figure 2:
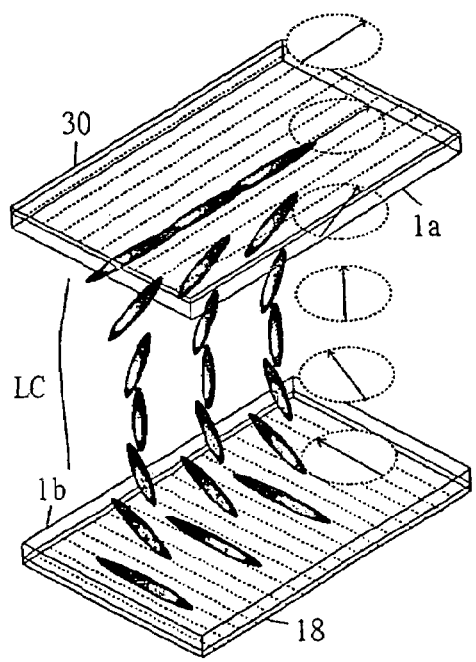
FIGS. 2 and 3 illustrate the operation of a conventional TN-LCD panel.
Figure 3:
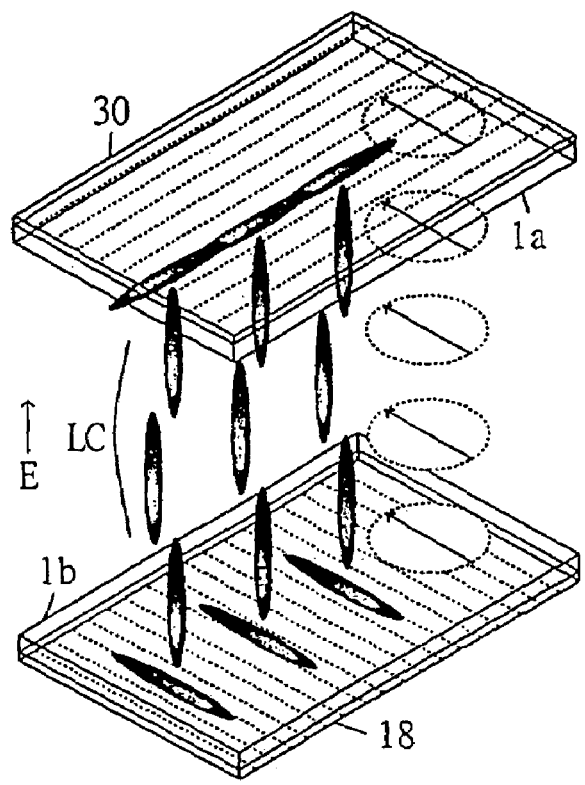
Figure 4:
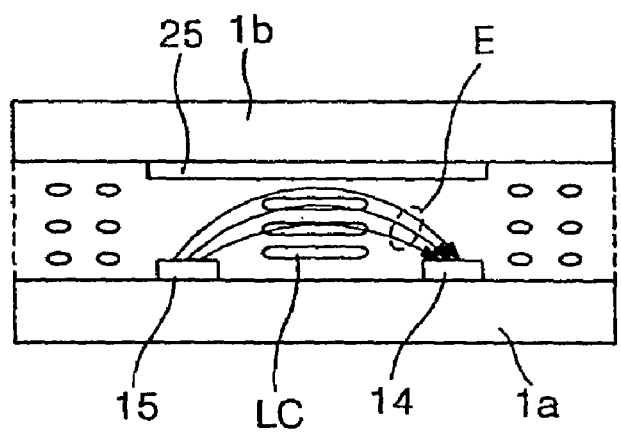
FIG. 4 is a cross-sectional view illustrating a conventional IPS-LCD device.
Figure 5:
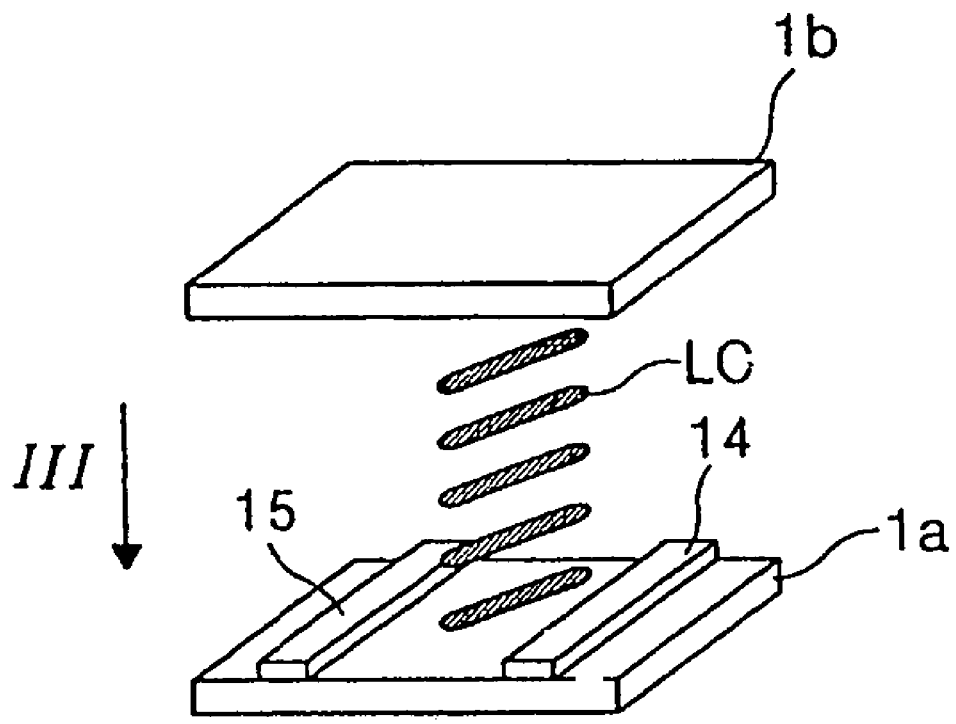
FIGS. 5 to 8 illustrate the operation of the device of FIG. 4.
Figure 6:
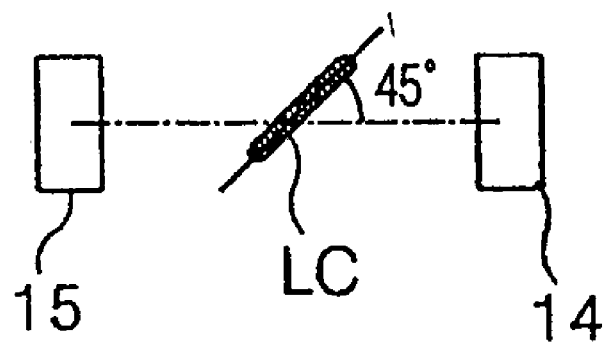
Figure 7:
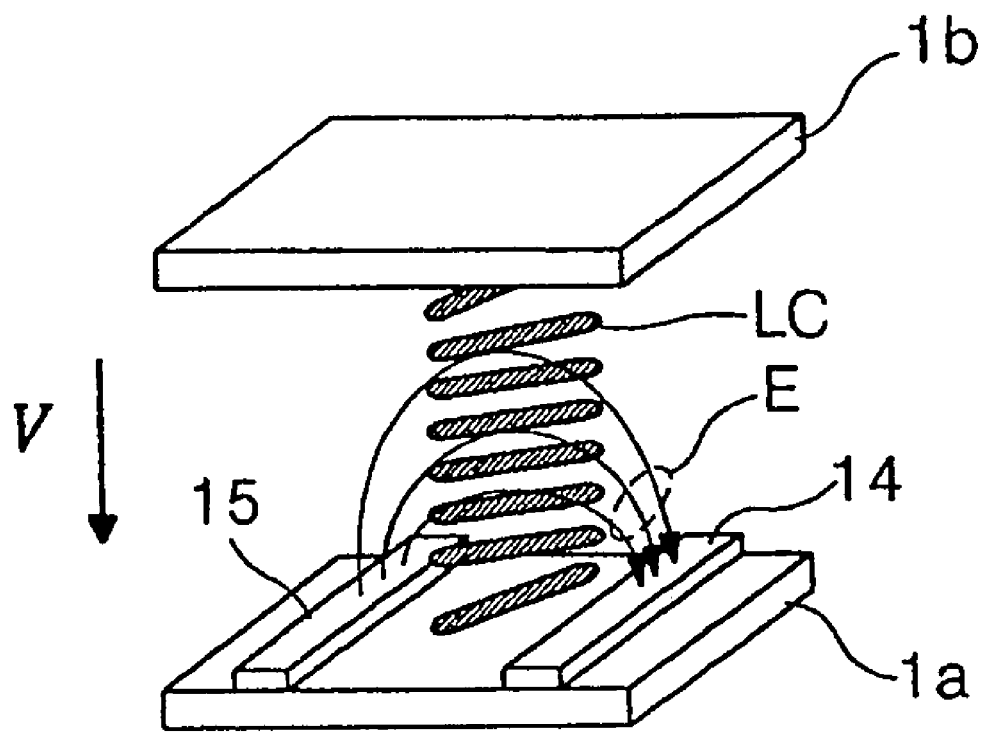
Figure 8:
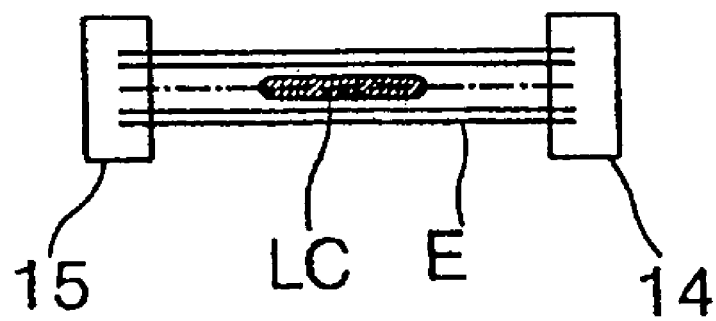
Figure 11:
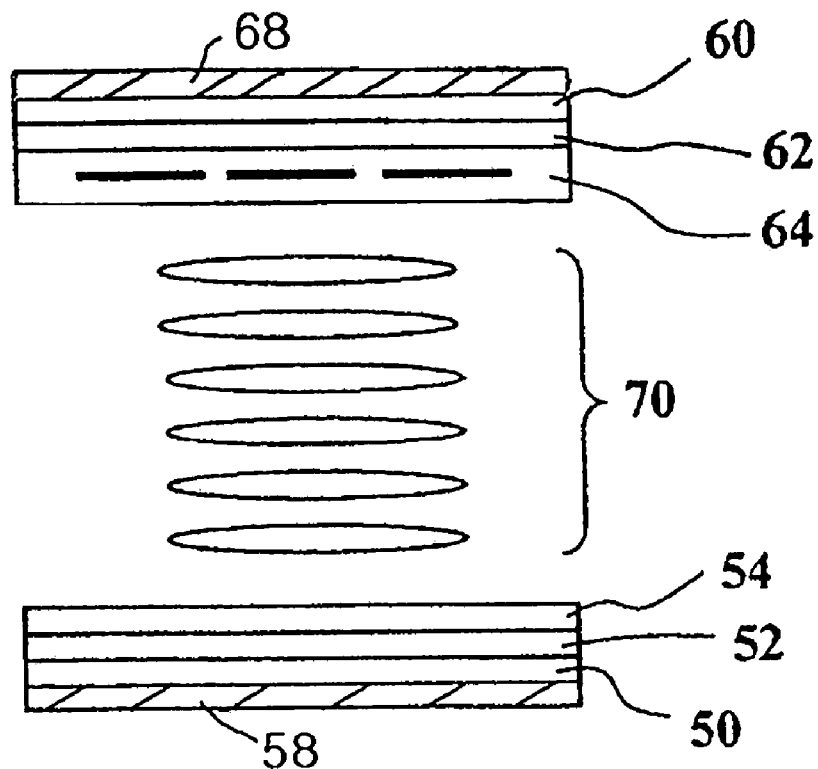
FIG. 11 is a cross sectional view illustrating a LCD panel according to an embodiment of the present invention.

As shown in FIG. 11, a lower substrate 50 having a switching device (not specifically shown, but reference the TFT in FIG. 1) is spaced apart from an upper substrate 60 that includes a color filter (again, not specifically shown, but reference FIG. 1). A liquid crystal layer 70 is disposed between the lower and upper substrates 50 and 60. Upper and lower polarizers 68 and 58 are positioned on exterior surfaces of the upper and lower substrates 60 and 50, respectively.

On the interior surface of the upper substrate 60 is a first electrode 62. On the first electrode 62 is an upper orientation film 64 having an FLCP layer. Further, on the interior surface of the lower substrate 50 is a second electrode 52. On the second electrode 52 is a lower orientation film 54.

The liquid crystal layer 70 can have a negative dielectric anisotropy. Alternatively, a positive dielectric anisotropy can be used for the liquid crystal layer 70. Also, a chiral dopant can be added to the liquid crystal layer 70. However, the liquid crystal layer 70 includes a twisted nematic liquid crystal layer that has a twist angle of at least 90 degrees. When an electric field that is perpendicular to the substrates is induced between the first and second electrodes 62 and 52, there is no rotational force to induce a polar angle to the molecules.

In another aspect, the upper and lower orientation films 64 and 54 have homogeneous alignments such that the LC molecules are homogeneously aligned at their early state by the orientation films.

Figure 12:
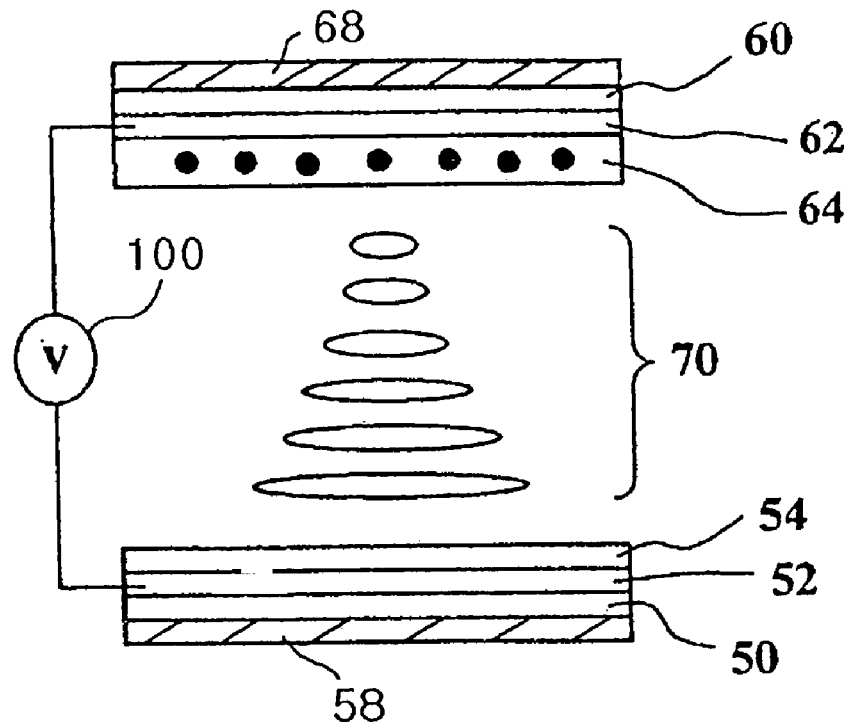
FIG. 12 is a cross sectional view illustrating an electric field applied to the LCD device of FIG. 11.

Referring now to FIG. 12, when a voltage source 100 applies a voltage between the first and second electrodes 62 and 52 an electric field that is perpendicular to the lower and upper substrates 50 and 60 is produced. Due to that electric field, a rotational force having a plane that is parallel with the upper substrate 60 is applied to the FLCP molecules of the upper orientation film 64. Therefore, the alignment of the FLCP molecules in the upper orientation film 64 changes.

Still referring to FIG. 12, at the boundary between the liquid crystal layer 70 and the upper FLCP orientation film 64, as the alignment of the FLCP molecules in the upper orientation film 64 changes, so does the alignment direction of the liquid crystal layer 70 adjacent the boundary. That is to say, when an electric field between the first and second electrodes 62 and 52 is created, the molecules of the liquid crystal layer 70 at the boundary follow the changed alignment of the FLCP molecules in the FLCP orientation film 64. The previously homogeneously aligned liquid crystal layer 70 is no longer homogeneously aligned. Accordingly, under an applied electric field, the liquid crystal layer 70 that was homogeneously aligned without the electric field changes its alignment to have a twist.

Referring now to FIGS. 11 and 12, the first and second polarizer 68 and 58 are respectively formed with regard to the alignment direction of the upper and lower orientation films 64 and 54. For example, a transmittance axis of the first polarizer 68 is perpendicular to the alignment direction of the upper orientation film 64, while the transmittance axis of the second polarizer 58 is parallel with the alignment direction of the lower orientation film 54. In that case, the transmittance axis directions of the first and second polarizers 68 and 58 are perpendicular to each other. In addition, the lower orientation film 54 may be formed with the FLCP orientation film.

Accordingly, when the liquid crystal molecules of the liquid crystal layer 70 are homogeneously aligned (no electric field), light incident on the first polarizer 68 is blocked either by the first polarizer 68, or by the second polarizer 58 after passing through the liquid crystal layer 70. This produces a dark state.

Further, when the liquid crystal molecules of the liquid crystal layer 70 are twisted by an electric field, the polarization of the light that passes through the first polarizer 68 is rotated along the twist of the liquid crystal molecules such that the light passes through the second polarizer 58. This is a white state.

In the above-mentioned operation, since the liquid crystal molecules rotate on planes parallel with the substrates, the color dependence on the viewing angle is low. Further, as there is little or no light leakage in the dark state, a high contrast ratio can be achieved.

Figure 9:
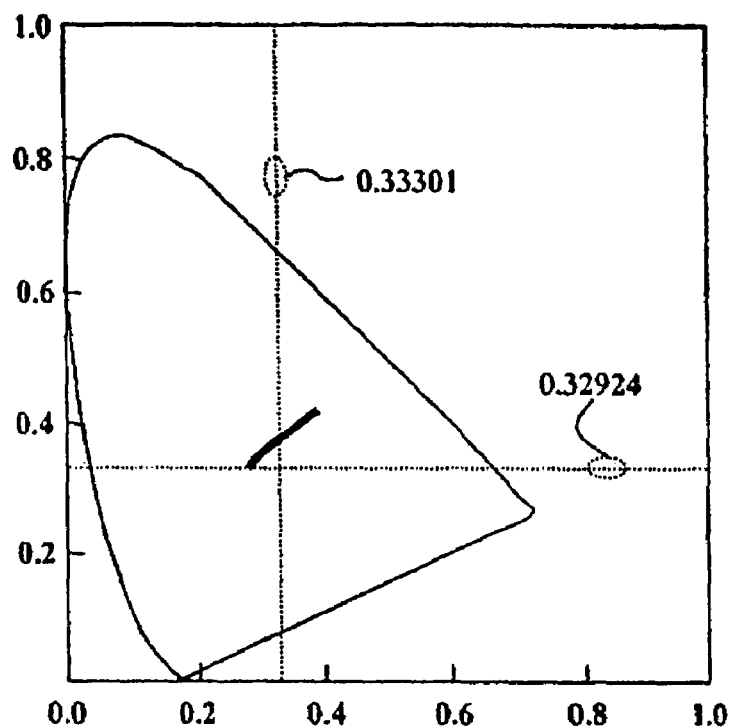
FIG. 9 is a graph of a color coordinate property with respect to various viewing angles of the conventional IPS-LCD device.
Figure 13:
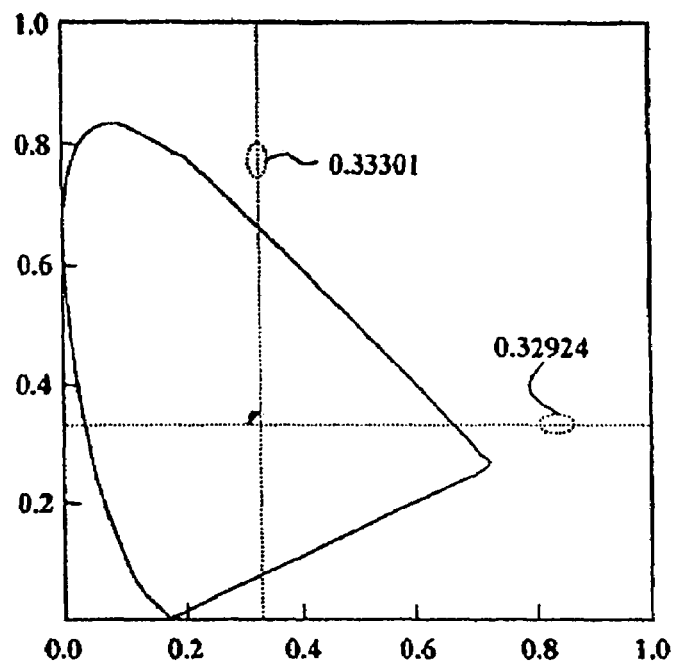
FIG. 13 is a graph illustrating a color coordinate property with respect to various viewing angles in an LCD device according to an embodiment of the present invention.

FIG. 13 is a graph of a CIE color coordinates that shows the dispersion of color in a liquid crystal display device according to the principles of the present invention. Similar to FIG. 9, the results are measured using a standard white light source and at various viewing angles of right, left, up and down, and 45 and 135 degrees. When compared with the long dispersion range shown in FIG. 9, the range of the color dispersion in FIG. 13 is very short, almost converging to a point. The almost converged color dispersion range means that the color dispersion characteristic of the LCD device according to the principles of the present invention are superior to that of the conventional IPS-LCD device. In other words, the color dependence on the viewing angle is much improved in an LCD device according to the principles of the present invention.

Contrary to the conventional IPS-LCD device described above, the first and second electrodes (common and pixel electrodes) of an LCD device according to the principles of the present invention are formed on different substrates. This enables an improved aperture ratio.

Figure 14:
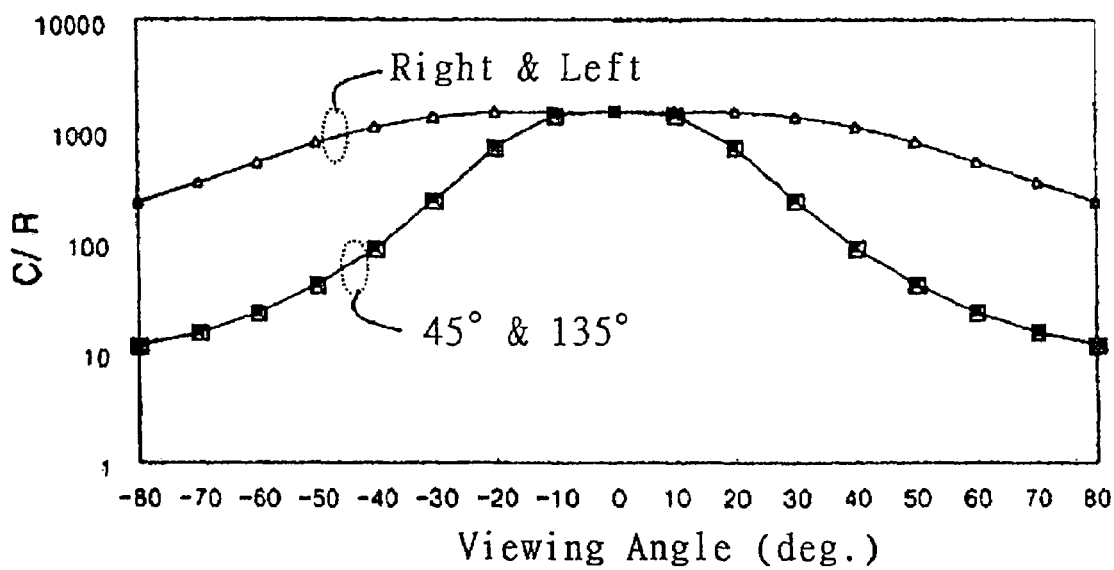
FIG. 14 is a graph illustrating a contrast ratio with respect to the viewing angle in an LCD device according to an embodiment of the present invention.
Figure 15:
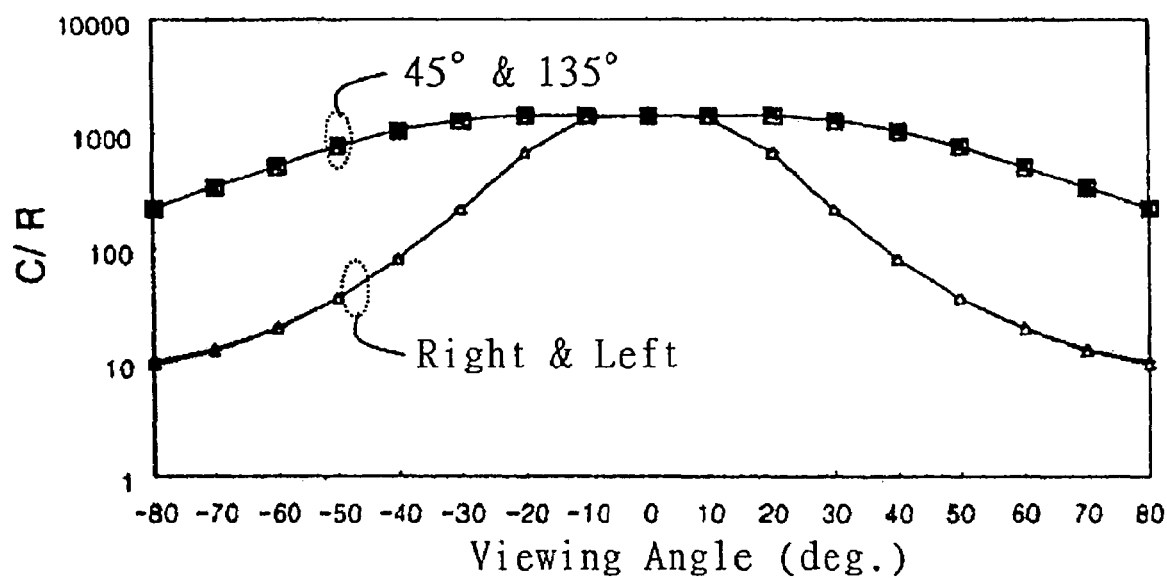
FIG. 15 is a graph illustrating the contrast ratio with respect to the viewing angle in a conventional IPS-LCD device.

FIG. 14 is a graph of the contrast ratio versus viewing angle of an LCD device according to the principles of the present invention, while FIG. 15 is a graph of the contrast ratio versus viewing angle of a conventional IPS-LCD device. By comparing FIGS. 14 and 15, it can be seen that the contrast ratio versus viewing angle quality of an LCD device according to the principles of the present invention is comparable to that of the conventional IPS-LCD device, which itself has a superior viewing angle to that of a conventional TN-LCD device.

An LCD device according to the principles of the present invention and a conventional TN-LCD device have some similarities in the twist alignments of their liquid crystal layer. However, the liquid crystal molecules of an LCD device according to the principles of the present invention rotate on planes parallel with the substrates, while the liquid crystal molecules of a conventional TN-LCD device rotate along a polar angle. Therefore, an LCD device according to the principles of the present invention has low dependence on the viewing angle. In addition, since there is little or no light leakage during the non-electric field mode, the contrast ratio of the LCD device according to the principles of the present invention is high.

As explained above, an LCD device according to the principles of the present invention has advantages of conventional TN-LCD and IPS-LCD devices, including a low dependence of color on the viewing angle, a high aperture ratio, and a wide viewing angle. In addition, since the FLCP layer of its upper orientation film changes alignment so fast, an LCD device according to the principles of the present invention shows superior response.

It will be apparent to those skilled in the art that various modifications and variation can be made to the illustrated embodiment without departing from the spirit or scope of the invention. For example, in another embodiment the transmittance axis of the upper polarizer can be perpendicular to the alignment direction of the lower orientation film while the transmittance axis of the first polarizer can be formed parallel with the alignment of the upper FLCP orientation film. Furthermore, the lower orientation film can include an FLCP layer. Thus, it is intended that the present invention cover all modifications and variations provided they come within the broad scope of the appended claims and their equivalents.

What is claimed is:

1. A liquid crystal display device comprising:
   a first substrate having a first electrode and a first orientation film on the first electrode;
   a second substrate having a second electrode and a second orientation film on the second electrode; and
   a nematic liquid crystal layer between the first and second substrates, wherein the second orientation film includes a ferroelectric liquid crystal polymer.

2. The liquid crystal display device according to claim 1, wherein the first orientation film includes a homogenous alignment film.

3. The liquid crystal display device according to claim 1, wherein the liquid crystal layer includes a positive dielectric anisotropy.

4. The liquid crystal display device according to claim 1, wherein the liquid crystal layer includes a chiral dopant.

5. The liquid crystal display device according to claim 1, wherein the liquid crystal layer includes a twist nematic liquid crystal layer.

6. The liquid crystal display device according to claim 5, wherein a twist angle of the twist nematic liquid crystal layer is at least 90 degrees.

7. The liquid crystal display device according to claim 1, further including a first polarizer on said first substrate.

8. The liquid crystal display device according to claim 7, further including a second polarizer on said second substrate.

9. The liquid crystal display device according to claim 7, wherein said first polarizer has a polarization axis perpendicular to an alignment direction of said first orientation film.

10. A liquid crystal display device according to claim 8, wherein said second polarizer has a polarizing axis parallel to an alignment direction of said second orientation film.

* * * * *